US006322683B1

(12) United States Patent
Wolk et al.

(10) Patent No.: US 6,322,683 B1
(45) Date of Patent: Nov. 27, 2001

(54) ALIGNMENT OF MULTICOMPONENT MICROFABRICATED STRUCTURES

(75) Inventors: Jeffrey A. Wolk, Half Moon Bay; Richard J. McReynolds, San Jose; J. Wallace Parce, Palo Alto, all of CA (US)

(73) Assignee: Caliper Technologies Corp., Mountain View, CA (US)

( * ) Notice: Subject to any disclaimer, the term of this patent is extended or adjusted under 35 U.S.C. 154(b) by 0 days.

(21) Appl. No.: 09/291,808

(22) Filed: Apr. 14, 1999

(51) Int. Cl.[7] .......... G01N 27/26
(52) U.S. Cl. .......... 204/600; 204/601; 204/604
(58) Field of Search .......... 204/600, 601, 204/604

(56) References Cited

U.S. PATENT DOCUMENTS

| | | |
|---|---|---|
| 4,390,403 | 6/1983 | Batchelder . |
| 4,908,112 | 3/1990 | Pace . |
| 4,963,498 | 10/1990 | Hillman et al. . |
| 5,089,099 | 2/1992 | Chien et al. . |
| 5,116,471 | 5/1992 | Chien et al. . |
| 5,126,022 | 6/1992 | Soane et al. . |
| 5,140,161 | 8/1992 | Hillman et al. . |
| 5,144,139 | 9/1992 | Hillman et al. . |
| 5,164,598 | 11/1992 | Hillman et al. . |
| 5,188,963 | 2/1993 | Stapleton . |

(List continued on next page.)

FOREIGN PATENT DOCUMENTS

| | | |
|---|---|---|
| 107631 | 5/1984 | (EP) . |
| 4-160356 | 6/1992 | (JP) . |
| WO9405414 | 3/1994 | (WO) . |
| WO9604547 | 2/1996 | (WO) . |
| WO9629595 | 9/1996 | (WO) . |
| WO9702357 | 1/1997 | (WO) . |

OTHER PUBLICATIONS

Bao, J. et al., "Ultramicro enzyme assays in a capillary electrophoretic system," *J. Chroma.* (1992) 608:217–224.

Cohen, C. B. et al., "A Microchip–Based Enzyme Assay for Protein Kinase A," *Anal. Chem.* (1999) 273:89–97.

Dasgupta, P. K. et al., "Electroosmosis: A Reliable Fluid Propulsion System for Flow Injection Analysis," *Anal. Chem.* (1994) 66:1792–1798.

Effenhauser, C. S. et al., "Glass Chips for High–Speed Capillary Electrophoresis Separation with Submicrometer Plate Heights," *Anal. Chem.* (1993) 65:2637–2642.

Fan, Z. H. et al., "Micromachining of Capillary Electrophoresis Injectors and Separators on Glass Chips and Evaluation of Flow at Capillary Intersections," *Anal. Chem.* (1994) 66:177–184.

Harmon, B. J. et al., "Mathematical Treatment of Electrophoretically Mediated Microanalysis," *Anal. Chem.* (1993) 65:2655–2662.

Harmon, B. J. et al., "Selectivity in Electrophoretically Mediated Microanalysis by Control of Product Detection Time," *Anal. Chem.* (1994) 66:3797–3805.

(List continued on next page.)

*Primary Examiner*—Arun S. Phasge
(74) *Attorney, Agent, or Firm*—Matthew B. Murphy

(57) ABSTRACT

Microfluidic devices are fabricated by fabricating structures that are used to align elements that are to be attached to the devices or tools that are to be used in further fabrication steps on those devices. Elements to be attached include additional substrate layers, external sampling elements, e.g. capillaries, and the like. Preferred alignment structures include wells over which reservoirs are positioned, notches for use with alignment keys to align substrate layers or for receiving additional structural elements, and targets or guide holes for receiving tooling in further fabrication steps.

19 Claims, 7 Drawing Sheets

U.S. PATENT DOCUMENTS

| | | | |
|---|---|---|---|
| 5,192,405 | 3/1993 | Petersen et al. . | |
| 5,270,183 | 12/1993 | Corbett et al. . | |
| 5,282,942 | 2/1994 | Herrick et al. . | |
| 5,302,264 | 4/1994 | Welch et al. . | |
| 5,304,487 | 4/1994 | Wilding et al. . | |
| 5,358,612 | 10/1994 | Dasgupta et al. . | |
| 5,415,747 | 5/1995 | Holloway . | |
| 5,486,335 | 1/1996 | Wilding et al. . | |
| 5,498,392 | 3/1996 | Wilding et al. . | |
| 5,536,382 | 7/1996 | Sunzeri . | |
| 5,560,811 | 10/1996 | Briggs et al. . | |
| 5,571,410 | 11/1996 | Swedberg et al. . | |
| 5,585,069 | 12/1996 | Zanzucchi et al. . | |
| 5,593,836 | 1/1997 | Zanzucchi et al. . | |
| 5,603,351 | 2/1997 | Cherukuri et al. . | |
| 5,605,662 | 2/1997 | Heller et al. . | |
| 5,630,925 | 5/1997 | Pentoney, Jr. et al. . | |
| 5,635,358 | 6/1997 | Wilding et al. . | |
| 5,637,469 | 6/1997 | Wilding et al. . | |
| 5,699,157 | 12/1997 | Parce . | |
| 5,750,015 | 5/1998 | Soane et al. . | |
| 5,779,868 | 7/1998 | Parce et al. . | |
| 5,800,690 | 9/1998 | Chow et al. . | |
| 5,842,787 | 12/1998 | Kopf-Sill et al. . | |
| 5,852,495 | 12/1998 | Parce . | |
| 5,869,004 | 2/1999 | Parce et al. . | |
| 5,876,675 | 3/1999 | Kennedy . | |
| 5,880,071 | 3/1999 | Parce et al. . | |
| 5,882,465 | 3/1999 | McReynolds . | |
| 5,885,470 | 3/1999 | Parce et al. . | |
| 5,890,745 | 4/1999 | Kovacs . | |
| 5,942,443 | 8/1999 | Parce et al. . | |
| 5,948,227 | 9/1999 | Dubrow . | |
| 5,955,028 | 9/1999 | Chow . | |
| 5,957,579 * | 9/1999 | Kopf-Sill et al. | 366/340 |
| 5,958,203 | 9/1999 | Parce et al. . | |
| 5,958,694 | 9/1999 | Nikiforov . | |
| 5,959,291 | 9/1999 | Jensen . | |
| 5,964,995 | 10/1999 | Nikiforov et al. . | |
| 5,965,001 | 10/1999 | Chow et al. . | |
| 5,965,410 | 10/1999 | Chow et al. . | |
| 5,972,187 | 10/1999 | Parce et al. . | |
| 5,976,336 | 11/1999 | Dubrow et al. . | |
| 5,989,402 | 11/1999 | Chow et al. . | |
| 6,001,231 | 12/1999 | Kopf-Sill . | |
| 6,004,515 | 12/1999 | Parce et al. . | |
| 6,011,252 | 1/2000 | Jensen . | |
| 6,012,902 | 1/2000 | Parce . | |

OTHER PUBLICATIONS

Harrison, D. J. et al., "Capillary Electrophoresis and Sample Injection Systems Integrated on a Planar Glass Chip," *Anal. Chem.* (1992) 64:1926–1932.

Harrison, D. J. et al., "Micromachining a Miniaturized Capillary Electrophoresis–Based Chemical Analysis System on a Chip," *Science* (1993) 261:895–897.

Holloway, C. J. et al., "The analysis of amino acids and peptides by isotachophoresis," *Electrophoresis* (1981) 2:127–134.

Jacobson, S. C. et al., "Effects of Injection Schemes and Column Geometry on the Performance of Microchip Electrophoresis Devices," *Anal. Chem.* (1994) 66:1107–1113.

Jacobson, S. C. et al., "High–Speed Separations on a Microchip," *Anal. Chem.* (1994) 66:1114–1118.

Jacobson, S. C. et al., "Open Channel Electrochromatography on a Microchip," *Anal. Chem.* (1994) 66:2369–2373.

Jacobson S. C. et al., "Precolumn Reactions with Electrophoretic Analysis Integrated on a Microchip," *Anal. Chem.* (1994) 66:4127–4132.

Jacobson, S. C. et al., "Microchip electrophoresis with sample stacking," *Electrophoresis* (1995) 16:481–486.

Jacobson, S. C. et al., "Fused Quartz Substrates for Microchip Electrophoresis," *Anal. Chem.* (1995) 67:2059–2063.

Kjellin, K. G. et al., "Isotachophoresis of CSF Proteins in Gel Tubes Especially Gammaglobullins," J. Neurol. (1979) 221:225–233.

Kopwillem, A. et al., "Serum Protein Fractionation by Isotachophoresis Using Amino Acid Spacers," *J. Chroma.* (1976) 118:35–46.

Linhares, M. C. et al., "Use of an On–Column Fracture in Capillary Zone Electrophoresis for Sample Introduction," *Anal. Chem.* Anal. Chem. (1991) 63:2076–2078.

Manz, A. et al., "Miniaturized Total Chemical Analysis Systems: a Novel Concept for Chemical Sensing," *Sensors and Actuators* (1990) B1:244–248.

Manz, A. et al., "Micromachining of monocrystalline silicon and glass for chemical analysis systems," *Trends in Anal. Chem.* (1991) 10(5):144–149.

Manz, A. et al., "Planar chips technology for miniaturization and integration of separation techniques into monitoring systems," *J. Chroma* (1992) 593:253–258.

Manz, A. et al., "Electroosmotic pumping and electrophoretic separations for miniaturized chemical analysis systems," *J. Micromech. Microeng.* (1994) 4:257–265.

Ramsey, J. M. et al., "Microfabricated chemical measurement systems," *Nature Med.* (1995) 1:1093–1096.

Sandoval, J. E. et al., "Method for the Accelerated Measurement of Electroosmosis in Chemically Modified Tubes for Capillary Electrophoresis," *Anal. Chem.* (1996) 68:2771–2775.

Seiler, K. et al., "Planar Glass Chips for Capillary Electrophoresis: Repetitive Sample Injection, Quantitation, and Separation Efficiency," *Anal. Chem.* (1993) 65:1481–1488.

Seiler, K. et al., "Electroosmotic Pumping and Valveless Control of Fluid Flow Within a Manifold of Capillaries on a Glass Chip," *Anal. Chem.* (1994) 66:3485–3491.

Svendsen, P. J. et al., "Separation of Proteins Using Ampholine Carrier Ampholytes as Buffer and Spacer Ions in an Isotachophoresis System," *Scienc Tools, the KLB Instrument Journal* (1970) 17:13–17.

* cited by examiner

ALIGNMENT OF MULTICOMPONENT MICROFABRICATED STRUCTURES

BACKGROUND OF THE INVENTION

The field of microfluidics has been held up as the next great advance in biological science, akin to the advances made in the electronics industry with the development of the microprocessor. In particular, the small scale, high level of accuracy and reproducibility, and ready automatability have led to expectations that this field of research will revolutionize the way work is done in research laboratories.

As with the electronics industry, incremental advances will be achieved as the operations performed by these microfluidics systems are expanded and optimized in accordance with their increasing acceptance in the scientific area. However, also as with the electronics industry, the most significant developments in this technology will likely not involve incremental advances in specific operations, but will instead revolve around advances in the technology used to fabricate these systems. In particular, some of the most significant advances in the electronics industry have come from improved methods of producing microchips, which allow substantially increased efficiency and greater functionality in a smaller area or space.

Fabrication of microfluidic systems typically involves the fabrication of grooves in the surface of a first substrate layer, which grooves will correspond to the channel network in a finished microfluidic device. A second substrate layer is overlaid and bonded to the first to seal the grooves thereby forming the channels. Apertures disposed in one of the substrates communicate with the channels and function as access ports and or reagent reservoirs for the devices. With certain exceptions, this fabrication process has been largely unimproved for some time. Commonly owned U.S. Pat. No. 5,882,465, to McReynolds, for example describes improved methods of mating and bonding the various substrate layers together in order to improve fabrication efficiency. Similarly, Published International Patent Application No. WO 98/00705 describes methods for fabricating microfluidic devices used in high throughput assay applications.

The present invention provides additional improvements in the fabrication of microfluidic devices, which improvements improve the efficiency both of the fabrication processes and operations to be performed by microfluidic devices.

SUMMARY OF THE INVENTION

In a first aspect, the present invention provides a microfluidic device comprising a first substrate layer with at least a first planar surface. The first planar surface has at least a first microscale groove fabricated therein. The groove terminates at at least one end in a well also fabricated into the first surface. A second substrate layer comprising at least a first aperture disposed therethrough is also part of the device. The aperture is of smaller dimensions than the well. The second substrate layer is mated with the first surface of the first substrate layer to cover the groove and positioned such that the aperture is in complete communication with the well.

Another aspect of the present invention is a method of fabricating a microfluidic device. First and second substrate layers are provided. A microscale groove is fabricated into at least a first surface of at least one of the first and second layers. Concurrently, an alignment structure is fabricated into the at least one surface of the first or second layers at a desired position relative to the microscale groove. One or more of a third component of the microfluidic device and a tool is mated with the alignment structure to align the third component or the tool relative to the microscale groove.

A further aspect of the present invention is a method of fabricating a multilayered microfluidic device. A first substrate layer includes a first notch. A second notch is included in a second substrate layer. The first and second notches are positioned to be complementary when the first and second substrate layers are mated together. An alignment key is inserted into one of the first and second notches. The alignment key is configured to fit into the first and second notches when the first and second substrate layers are mated together and aligned in a first relative position. The first substrate layer is mated and bonded to the second substrate layer in the first relative position.

DETAILED DESCRIPTION OF THE INVENTION

The present invention is generally directed to microfluidic devices and systems, and improved methods of manufacturing these devices and systems. In particular, the methods of the present invention facilitate the manufacture of microfluidic devices by facilitating either the fabrication of elements on those devices or the joining of additional elements to those devices, and particularly to the microscale channel networks contained therein.

As used herein, the term “microscale” or “microfabricated” generally refers to structural elements or features of a device which have at least one fabricated dimension in the range of from about 0.1 μm to about 500 μm. Thus, a device referred to as being microfabricated or microscale will include at least one structural element or feature having such a dimension. When used to describe a fluidic element, such as a passage, chamber or conduit, the terms “microscale,” “microfabricated” or “microfluidic” generally refer to one or more fluid passages, chambers or conduits which have at least one internal cross-sectional dimension, e.g., depth, width, length, diameter, etc., that is less than 500 μm, and typically between about 0.1 μm and about 500 μm. In the devices of the present invention, the microscale channels or chambers preferably have at least one cross-sectional dimension between about 0.1 μm and 200 μm, more preferably between about 0.1 μm and 100 μm, and often between about 0.1 μm and 20 μm. Accordingly, the microfluidic devices or systems prepared in accordance with the present invention typically include at least one microscale channel, usually at least two intersecting microscale channels, and often, three or more intersecting channels disposed within a single body structure. Channel intersections may exist in a number of formats, including cross intersections, "T" intersections, or any number of other structures whereby two channels are in fluid communication.

The body structure of the microfluidic devices described herein typically comprises an aggregation of two or more separate layers which when appropriately mated or joined together, form the microfluidic device of the invention, e.g., containing the channels and/or chambers described herein. Typically, the microfluidic devices described herein will comprise a top portion, a bottom portion, and an interior portion, wherein the interior portion substantially defines the channels and chambers of the device.

Figure 1:
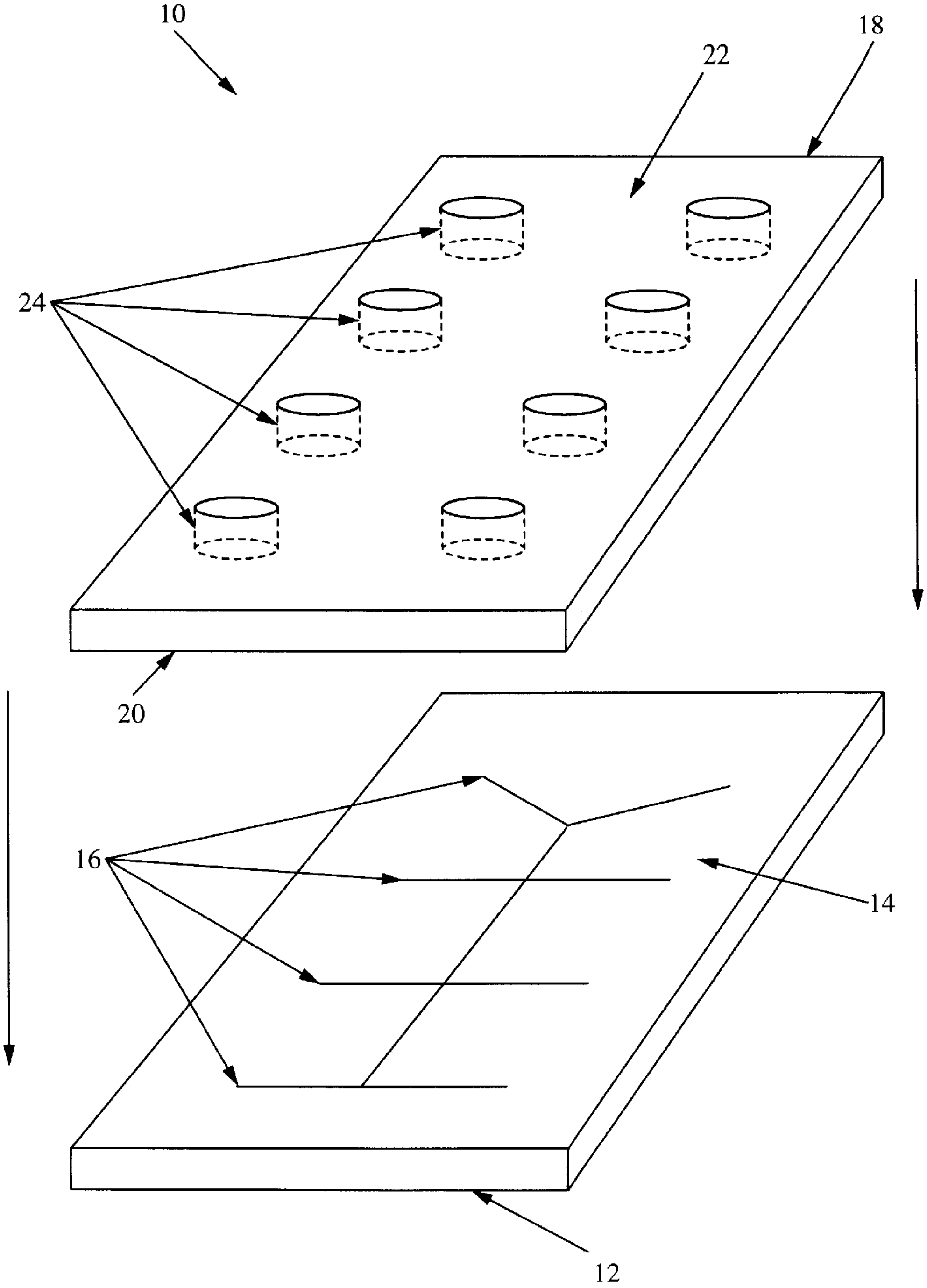
FIG. 1 schematically illustrates microfluidic device comprised of a plurality of substrate layers where the microscale channel network is defined between the substrate layers.

FIG. 1 illustrates an example of a two-layer body structure 10, for a microfluidic device. As shown, the bottom portion of the device 12 comprises a solid substrate that is substantially planar in structure, and which has at least one substantially flat upper surface 14. A variety of substrate materials may be employed as the bottom portion. Typically, because the devices are microfabricated, substrate materials will be selected based upon their compatibility with known microfabrication techniques, e.g., photolithography, wet chemical etching, laser ablation, air abrasion techniques, injection molding, embossing, and other techniques. The substrate materials are also generally selected for their compatibility with the full range of conditions to which the microfluidic devices may be exposed, including extremes of pH, temperature, salt concentration, and application of electric fields. Accordingly, in some preferred aspects, the substrate material may include materials normally associated with the semiconductor industry in which such microfabrication techniques are regularly employed, including, e.g., silica based substrates, such as glass, quartz, silicon or polysilicon, as well as other substrate materials, such as gallium arsenide and the like. In the case of semiconductive materials, it will often be desirable to provide an insulating coating or layer, e.g., silicon oxide, over the substrate material, and particularly in those applications where electric fields are to be applied to the device or its contents.

In additional preferred aspects, the substrate materials will comprise polymeric materials, e.g., plastics, such as polymethylmethacrylate (PMMA), polycarbonate, polytetrafluoroethylene (TEFLON™), polyvinylchloride (PVC), polydimethylsiloxane (PDMS), polysulfone, polystyrene, polymethylpentene, polypropylene, polyethylene, polyvinylidine fluoride, ABS (acrylonitrile-butadiene-styrene copolymer), and the like. Such polymeric substrates are readily manufactured using available microfabrication techniques, as described above, or from microfabricated masters, using well known molding techniques, such as injection molding, embossing or stamping, by polymerizing the polymeric precursor material within the mold (See U.S. Pat. No. 5,512,131), or by laser ablation techniques. Such polymeric substrate materials are preferred for their ease of manufacture, low cost and disposability, as well as their general inertness to most extreme reaction conditions. Again, these polymeric materials may include treated surfaces, e.g., derivatized or coated surfaces, to enhance their utility in the microfluidic system, e.g., provide enhanced fluid direction, e.g., as described in U.S. Pat. No. 5,885,470 which is incorporated herein by reference in its entirety for all purposes.

The channels and/or chambers of the microfluidic devices are typically fabricated into the upper surface of the bottom substrate or portion 12, as microscale grooves or indentations 16, using the above described microfabrication techniques. The top portion or substrate 18 also comprises a first planar surface 20, and a second surface 22 opposite the first planar surface 20. In the microfluidic devices prepared in accordance with the methods described herein, the top portion also includes a plurality of apertures, holes or ports 24 disposed therethrough, e.g., from the first planar surface 20 to the second surface 22 opposite the first planar surface. The upper substrate is then overlaid and bonded to the upper surface of the lower substrate, whereby the grooves are sealed to form channels. The apertures disposed through the upper substrate then become wells or reservoirs that are in fluid communication with the termini of the channels in the finished layered device.

Movement of materials through the various channels of the device is generally carried out by any number of a variety of material transport systems. For example, in some cases, fluids or other materials are transported through the channels of the device using controlled electrokinetic transport methods.

Alternatively, pressure-based fluid transport methods may be used. In such cases, a pressure differential is created across the length of the channel segment through which fluid flow is desired, forcing or drawing the fluid through that channel. Establishing these pressure differentials may be accomplished by, e.g., applying positive pressures to the reservoirs at one end of a channel system, or alternatively, applying a negative pressure to a waste reservoir. Methods of engineering channel systems to simplify the application of pressure and/or vacuum is described in, e.g., U.S. patent application Ser. No. 09/277,367, filed Mar. 26, 1999, and incorporated herein by reference in its entirety for all purposes. Alternative pressure-based systems employ integrated pumps and valves within the body structure of a microfluidic device to drive fluid movement through the channels of the device in a controlled fashion. Such integrated pumps and valves are described in, e.g., Published International Patent Application No. WO 97/02357. In still other alternative pressure-based systems, a wicking material may be employed to draw fluids or other materials through the channels of the device, by placing the absorbent wicking material at an outlet port of one or more of the channels of the device. The wicking material then draws fluid out of the channel thereby creating a pressure differential to pull fluid through the channel.

Because of their extremely small size, as well as their use in extremely sensitive and accurate analyses, slight variations in fabrication among different microfluidic devices can have substantial effects on the operation of those devices. As a result, it is desirable to ensure the most accurate fabrication methods. In accordance with the present invention, these methods utilize improved methods of aligning either the tooling which is used to fabricate such devices, or additional elements that are to be attached or otherwise joined with those devices or portions thereof.

For example, regardless of whether a microfluidic device utilizes pressure based material transport or electrokinetic methods, inconsistencies in manufacturing can lead to inconsistencies in the flow of material through the channels of the device. In the typical fabrication of a microfluidic channel network, e.g., as described above, the upper substrate layer, e.g., that incorporating the reservoirs or wells, is overlaid upon the lower substrate layer, e.g., the layer incorporating the network of grooves or channels. Positioning of the reservoirs over the channels or grooves can affect the length of the channels. Specifically, if the upper layer is shifted to one side, it may cover or uncover more of the channel. In order to fabricate efficient, useful systems, tolerances are set for the alignment process. Similarly, tolerances are set for the fabrication of the channels and apertures, e.g., tolerances for size and position.

Figure 2B:
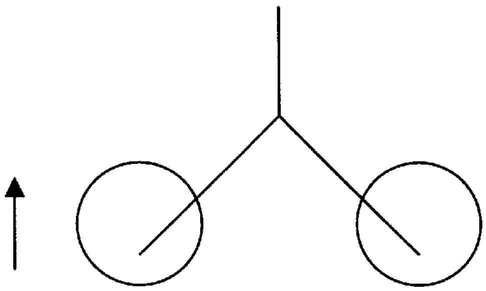
FIGS. 2A–C schematically illustrate the influences of substrate alignment on channel configuration.
Figure 2C:
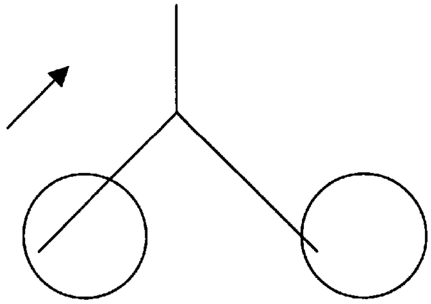
Figure 2A:
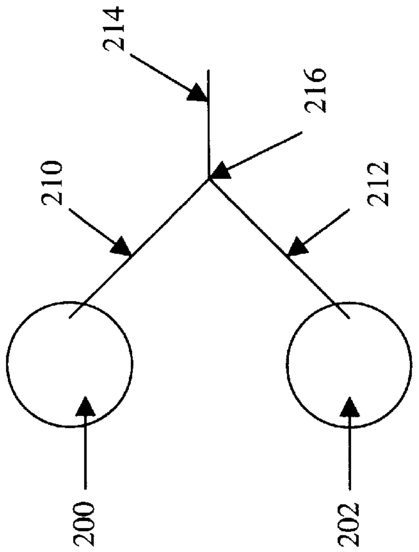

In the case of the positioning of the layers, potential variations are illustrated in FIG. 2. In particular, FIG. 2A illustrates a portion of a device where the reservoirs 200 and 202 in the reservoir bearing substrate, e.g., upper substrate 18 from FIG. 1, are positioned in an exemplary desirable orientation relative to the channel bearing substrate, e.g., lower substrate 14. In particular, the reservoirs 200 and 202 are positioned such that the channels connected to these reservoirs, 210 and 212, respectively, are of equivalent length before joining with channel 214 at the intersection 216.

As shown in FIG. 2B, however, shifting of the reservoir bearing substrate in one direction relative to the channel bearing substrate, e.g., in the direction of the arrow, dramatically shortens the effective length of channels, e.g., that portion defined between the two substrate layers, prior to the intersection 216. While this would likely not substantially affect the ratio of material from reservoirs 200 and 202 relative to each other in the example shown, their ratios relative to materials introduced from other downstream reservoirs could be dramatically affected. However, such a variation is, in fact, illustrated in FIG. 2C, which illustrates a further shifting of the reservoir bearing substrate relative to the other substrate. In this case, channel 210 is substantially shortened relative to channel 212 prior to the intersection 216. The result is two channels with markedly different flow characteristics, e.g., resistances (both electrical and hydrodynamic).

In both pressure-based and electrokinetic transport, the rate of movement of material is inversely proportional to the resistance through the channel, whether that resistance is electrical resistance or hydrodynamic resistance. Restated, the longer a channel is, the more energy that is required, either electrical or pressure, to drive fluids or other materials through that channel. Conversely, the shorter the channel, the less energy is required. Thus, in the case of the scenarios illustrated in FIG. 2, it is clear that the amount of energy required to move material from each of reservoirs 200 and 202 to the intersection 216 at a given flow rate, would be substantially greater in the network illustrated in FIG. 2A than for that shown in FIG. 2B. Similarly, in the scenario illustrated in FIG. 2C, the amount of energy required to move material from reservoir 202 to the intersection 216 at a particular flow rate would be substantially greater than that required to move material from reservoir 200 to intersection 216 at the same flow rate. In the case where a single driving force is used to move fluids through the various channels, e.g., a single vacuum applied to channel 214, unknown variations in the lengths of channels 210 and 212 can lead to unknown variations in their contributed flow rates.

The present invention addresses the above-described inconsistencies in manufacture of channel networks. In particular, in at least a first aspect, the present invention provides microfluidic devices, which are fabricated from multiple layers. The first substrate layer typically includes at least a first planar surface having at least a first microscale groove fabricated therein. In addition, the surface also typically includes a well or depression also fabricated therein, such that the groove terminates at at least one of its ends in the well. The well is configured such that the aperture provided within the second covering substrate layer will more easily be positioned entirely over the well. Specifically, the well is typically provided with cross-sectional dimensions that are markedly larger than the cross sectional dimensions of the aperture (or the aperture is dimensioned smaller than the well), so as to provide a relatively larger target to hit when assembling the layers. Accordingly, the aperture in the assembled device will be in complete communication with the well. By "in complete communication" is meant that the aperture opening at the interface of the two substrate layers is entirely included by the well.

Figure 3B:
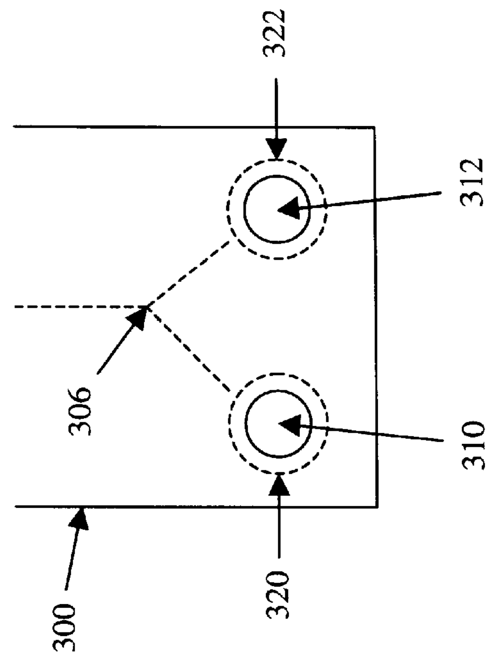
FIGS. 3A–B illustrate the use of alignment facilitating structures in accordance with the present invention, and particularly the use of wells to minimize the effects of misalignment of reservoirs in a multi-layered device structure.
Figure 3A:
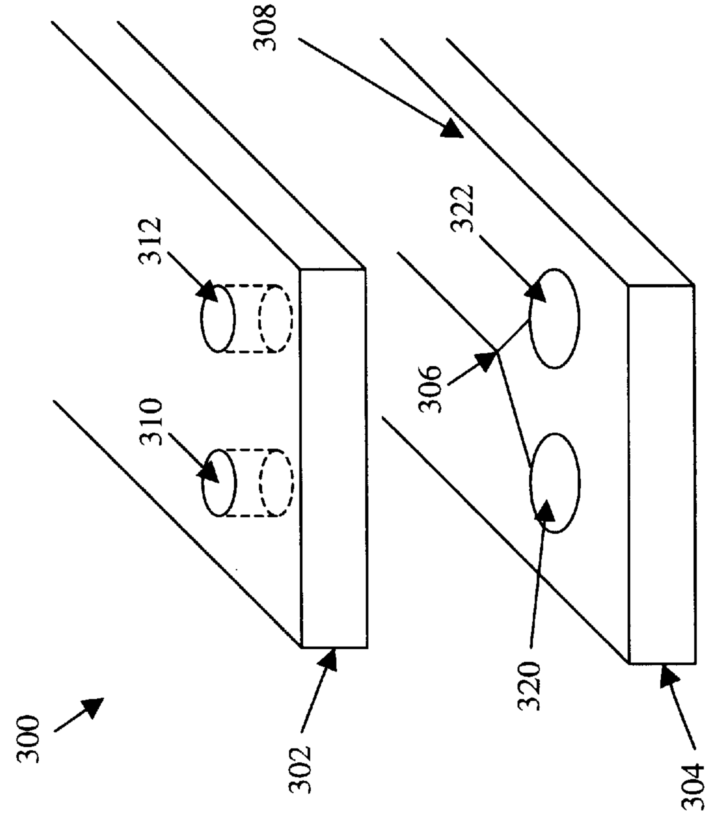

This aspect of the present invention is schematically illustrated in FIG. 3. In particular, as shown in FIG. 3A, the body structure of the overall device 300 is again fabricated as an aggregation of substrate layers 302 and 304, where a series of grooves 306 is fabricated onto the upper surface 308 of the lower substrate layer 304, and the reservoirs at the termini of the channels are fabricated as apertures 310 and 312 disposed through the upper substrate layer 302. In accordance with the present invention, however, wells or depressions 320 and 322 are also fabricated into the upper surface 308 of the lower substrate 304 at the same time and using the same processes used in fabricating the grooves that ultimately form the channels. These wells are typically larger than the apertures 310 and 312 that are provided through the upper substrate layer 302, so that positioning of those apertures completely within the boundaries of the wells in the ultimate aggregate device is facilitated. In particular, slight to moderate shifting of the upper substrate relative to the lower substrate will have only a minimal effect on the relevant channel length and/or resistance through that channel. FIG. 3B illustrates the invention from a top view. As shown in FIG. 3B, the wells 320 and 322 indicated by the dashed lines are larger than the apertures/reservoirs 310 and 312 of the assembled device. Also, as can be appreciated from these figures, moderate shifting of the apertures 310 and 312, relative to the channel system of the device, yields substantially no change in the effective length of the channels from a resistance standpoint.

Although the wells and apertures are illustrated as being circular, it will be appreciated that a variety of different shapes are practicable for each or either of these elements. Of greater importance than the shape of the aperture and well is that the well be of larger dimension than the aperture. Typically, the well has a cross sectional dimension, e.g., diameter, that is at least 2% larger than the like cross-sectional dimension of the aperture. Preferably, the cross-section of the well is at least 5% larger, often at least 10%, and in some cases at least 20% larger than the like dimension of the aperture. Typically, the well and aperture will be between about 1 mm and about 10 mm in cross-section, e.g., diameter, and preferably, between about 3 mm and about 8 mm.

As described above, tolerances are typically set for the size of the apertures in the upper substrate layer, as well as the position of those apertures. Thus, in certain particularly preferred aspects, the wells are fabricated to have a radius that is larger than the preselected radius of the apertures, e.g., the designated radius before fabrication without consideration of the tolerance, by at least equivalent to the sum of the tolerances for the position and radius of the apertures and preferably at least 2 times the sum of the tolerances. Thus, if the position of the aperture has a tolerance of +/−1 mm in any direction, and the radius of the aperture has a tolerance of +/−1 mm, the total tolerance for the aperture is 2 mm, and the well will have a radius that is at least 2 mm larger than the preselected radius size of the aperture. Where the radius is preselected to be 5 mm, the well will then have a radius that is at least 7 mm and preferably, at least 9 mm. Of course, the precise size of the well is dependent upon both the size of the aperture and the positional and radius tolerances for the aperture. These tolerances will typically vary depending upon the precision that is desired for the ultimately fabricated device. Typically tolerances for the position of the aperture will be from about 100 μm to about 2 mm, while the radius tolerance will typically be from about 10 μm to about 1 mm. Aperture sizes will typically range from about 1 mm to about 1 cm in diameter.

As noted above, typically the microfluidic devices include a number of channels which connect a plurality of reservoirs, e.g., e.g., one, two, three, five, ten or more different channels which may or may not intersect one or more of the other channels. As such, the channels (also termed a channel network) will typically each terminate in one of a plurality of separate wells, which, in turn, are in complete communication with a plurality of separate apertures in the assembled device.

Fabrication of the wells into the surface of the first or lower substrate layer is typically carried out using the same methods as described above for fabricating the channels, and, typically, is carried out during the same unit operation. By fabricating these elements in the same process steps, one can ensure consistency in the relative positions of these elements from one device to the next.

Figure 5:
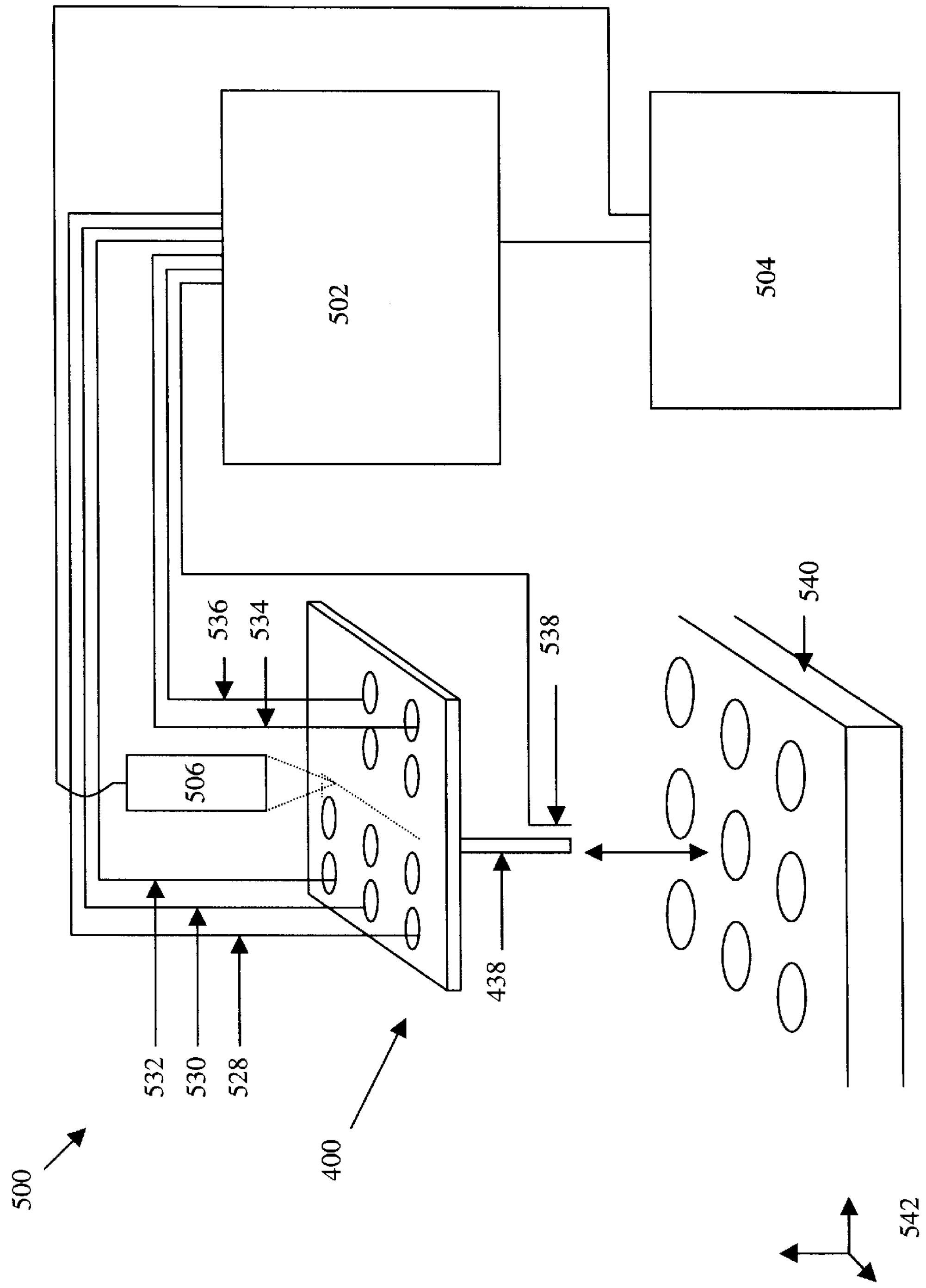
FIG. 5 illustrates a microfluidic device coupled with appropriate controller and detector instrumentation for accessing externally stored materials.

As noted above, the devices described herein may employ any of a variety of different material transport systems for moving material through the channels of the assembled device. Accordingly, in some aspects, the devices incorporate elements, which facilitate interfacing of these transport systems with the device itself. For example, in devices using electrokinetic transport, e.g., as described above, it is sometimes desirable to provide the reservoirs of the assembled devices with electrodes predisposed within the reservoirs, which electrodes provide the interface between the channel networks and an electrical controller system. This electrical interfacing is schematically illustrated in FIG. 5, discussed in greater detail, below.

In alternate aspects, a pressure source is provided connected to one or more reservoirs of the device. As used herein, a pressure source includes a source of positive or negative pressure, e.g., pressure or vacuum pumps, a hydrostatic pressure source, e.g., a fluid column or siphon, a wick placed at one terminus of the channel network to draw fluid through the device, and a capillary network, which draws fluid through the channels by capillary action.

This aspect of the present invention also has additional advantages. For example, by providing a maximum footprint or channel and reservoir layout on the lower substrate, one can more effectively plan out and condense channel network geometries. Specifically, because one fabricates that largest effective dimensions of the channel and reservoir layouts, one can place additional channels, etc. more closely together without any concern for whether such channels may be overlapped by a reservoir in the ultimate device.

The present invention also addresses other inconsistencies of the fabrication process through a similar mechanism, namely the inclusion of alignment facilitating elements in the fabrication process, such that alignment of a first structural element with a second structural element is dictated by the fabrication of the first element. One example where this is particularly useful is in the fabrication of microfluidic devices that incorporate external fluidic elements that must be integrated with internal fluidic elements. One example of such devices is that which includes an external capillary element for accessing externally stored samples.

Figure 4:
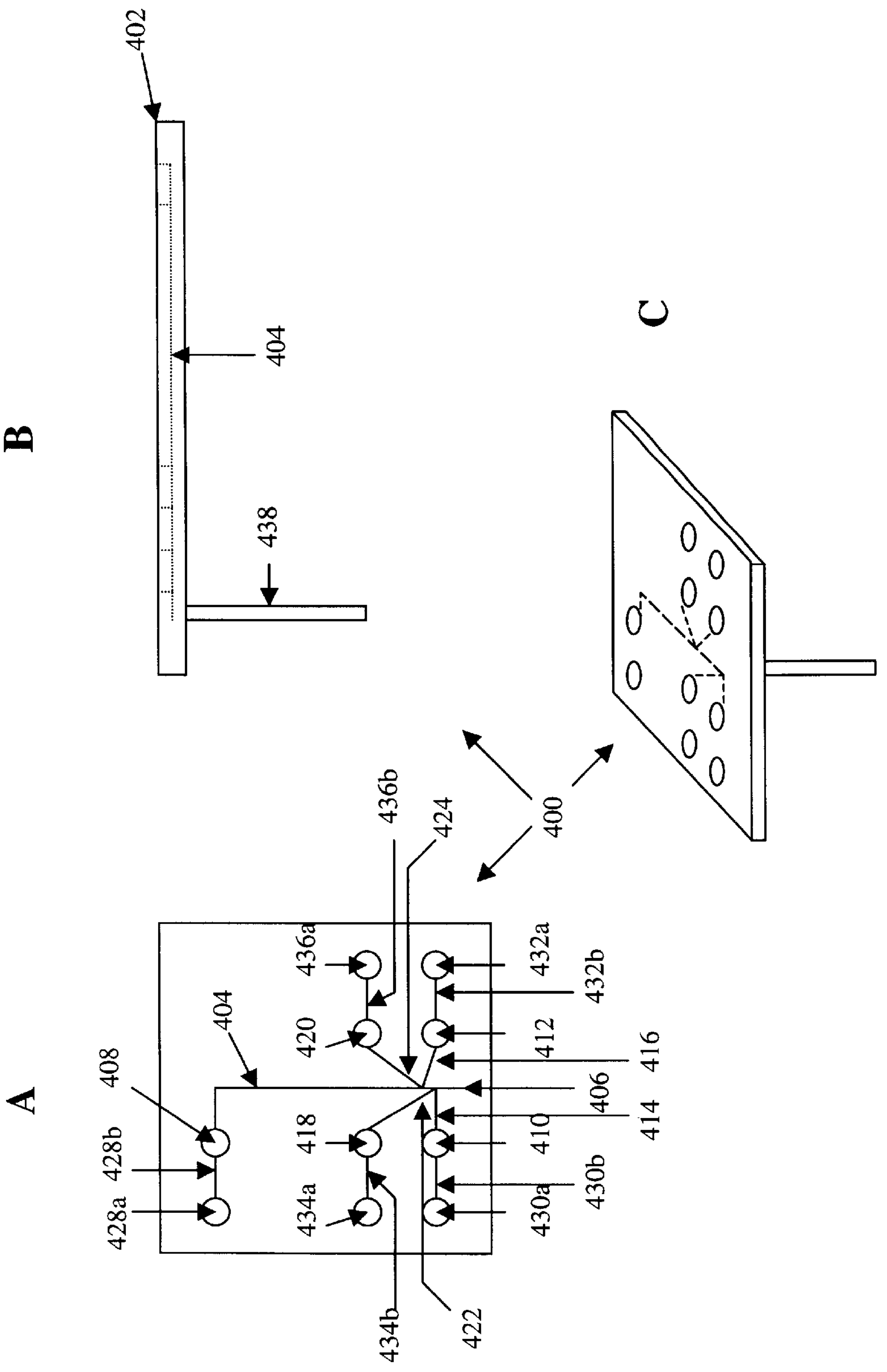
FIG. 4 illustrates one example of a microfluidic device that includes an external sampling pipettor element.

FIG. 4 is a schematic illustration of a microfluidic device and integrated pipettor element from a top (Panel A), side (Panel B) and perspective view (Panel C). As shown, the device 400 includes a main body structure 402 that includes a channel network disposed in its interior. The channel network includes a main analysis channel 404, which fluidly connects a sample inlet 406 with waste reservoir 408. Two reagent reservoirs 410 and 412 are provided in fluid communication with the analysis channel 404 via channels 414 and 416, respectively. Reagent reservoirs 410 and 412 are paired with buffer/diluent reservoirs 418 and 420, respectively, which are in communication with channels 414 and 416 via channels 422 and 424, respectively. In order to prevent electrolytic degradation of reagent and/or buffer materials, each of reservoirs 408, 410, 412, 416 and 420 is provided in electrical and/or fluid communication with an electrical access reservoir/salt bridge channel 428*a/b,* 430*a/b,* 432*a/b,* 434*a/b,* and 436*a/b,* respectively. The provision of an electrical access reservoir/salt bridge allows the application of voltages via electrodes for long periods of time without resulting in substantial degradation of reagents, buffers or the like. It should be noted that as reservoir 408 is a waste well, it typically does not require a separate electrical access reservoir/salt bridge, e.g., 428*a/b*.

The device also includes a capillary element 438 which includes an internal capillary channel running its length, the capillary channel communicating with the analysis channel 404 via the sample inlet 406. Although shown as being perpendicular to the main body structure of the device 402, it will be appreciated that the capillary element can be coplanar with the body structure, e.g., extending in the same plane as the body structure and collinear with the analysis channel, e.g., as described in Published International Application No. WO 98/00705, which is incorporated herein by reference.

FIG. 5 is a schematic illustration of a microfluidic device incorporating an integrated pipettor element, as well as the overall material transport control and detection system, which incorporates the microfluidic device. As shown, the system 500 includes a microfluidic device 400, which incorporates an integrated pipettor/capillary element 438. Each of the electrical access reservoirs 428*a*–436*a,* has a separate electrode 528–536 disposed therein, e.g., contacting the fluid in the reservoirs. Each of the electrodes 528–536 is operably coupled to an electrical controller 502 that is capable of delivering multiple different voltages and/or currents through the various electrodes. Additional electrode 538, also operably coupled to controller 502, is positioned so as to be placed in electrical contact with the material that is to be sampled, e.g., in multiwell plate 540, when the capillary element 438 is dipped into the material. For example, electrode 538 may be an electrically conductive coating applied over capillary 438 and connected to an electrical lead which is operably coupled to controller 502. Alternatively, electrode 538 may simply include an electrode wire positioned adjacent the capillary so that it will be immersed in/contacted with the sample material along with the end of the capillary element 538. Alternatively, the electrode may be associated with the source of material, as a conductive coating on the material source well or as a conductive material from which the source well was fabricated. Establishing an electric field then simply requires contacting the electrical lead with the source well material or coating. Additional materials are sampled from different wells on the multiwell plate 540, by moving one or more of the plate 540 and/or device 400 relative to each other prior to immersing the pipettor 438 into a well. Such movement is typically accomplished by placing one or more of the device 400 or multiwell plate 540 on a translation stage, e.g., the schematically illustrated x-y-z translation stage 542.

In at least one aspect, the capillary element includes at least one end that is substantially rectangular, so as to easily mate with a corresponding substantially rectangular opening on the body structure of the microfluidic device during fabrication of the overall device. Rectangular capillaries for use as the capillary element are generally commercially available, e.g., from VitroCom, Inc. or Mindrum Precision Products, Inc.

In fabricating these pipettor devices, component alignment can yield a number of problems in addition to those recited above. Most notably, fabrication of reservoirs or apertures, and/or attachment of an external capillary element must be precisely positioned in order that the channel in the external capillary element is aligned with the channel(s) in the interior of the device. For example, in some cases, an external sampling capillary element is attached to a microfluidic device by drilling a hole into the body structure of the device, or a layer of the device, into which the capillary is inserted. Typically, the hole for the capillary element is disposed in the substrate layer that does not have the channel fabricated into it. This allows the capillary element to be completely inserted into the hole without blocking the channel in the body structure. Of course, this also requires precise alignment of the hole in one substrate layer with the channel in the other layer, so that the channel in the capillary communicates with the channel in the body structure. As such, an alignment mark is typically fabricated onto the channel bearing substrate at the same time as the channels, in order to align the hole with the channel in the opposing substrate.

Additionally or alternatively, because solid substrates often incorporate extremely smooth surfaces, it can be difficult to machine the hole with such precision. Thus, in certain aspects, the present invention provides that an alignment mark or guide hole is fabricated into the substrate surface through which a hole is to be drilled. This alignment mark or guide hole may be fabricated into the channel bearing substrate, e.g., where the hole is to function as a reservoir, at the same time that the channel is fabricated into that surface, and by the same mechanism, e.g., injection molding, embossing, etching of silica-based substrates, and the like. Alternatively, it may be fabricated into the opposing substrate where the hole is to be used as a junction with an external capillary. The guide hole is fabricated of such dimensions that any tools used in subsequent fabrication steps, e.g., a drill or the like, inserted into the guide hole will not wander during the machining process.

Figure 6:
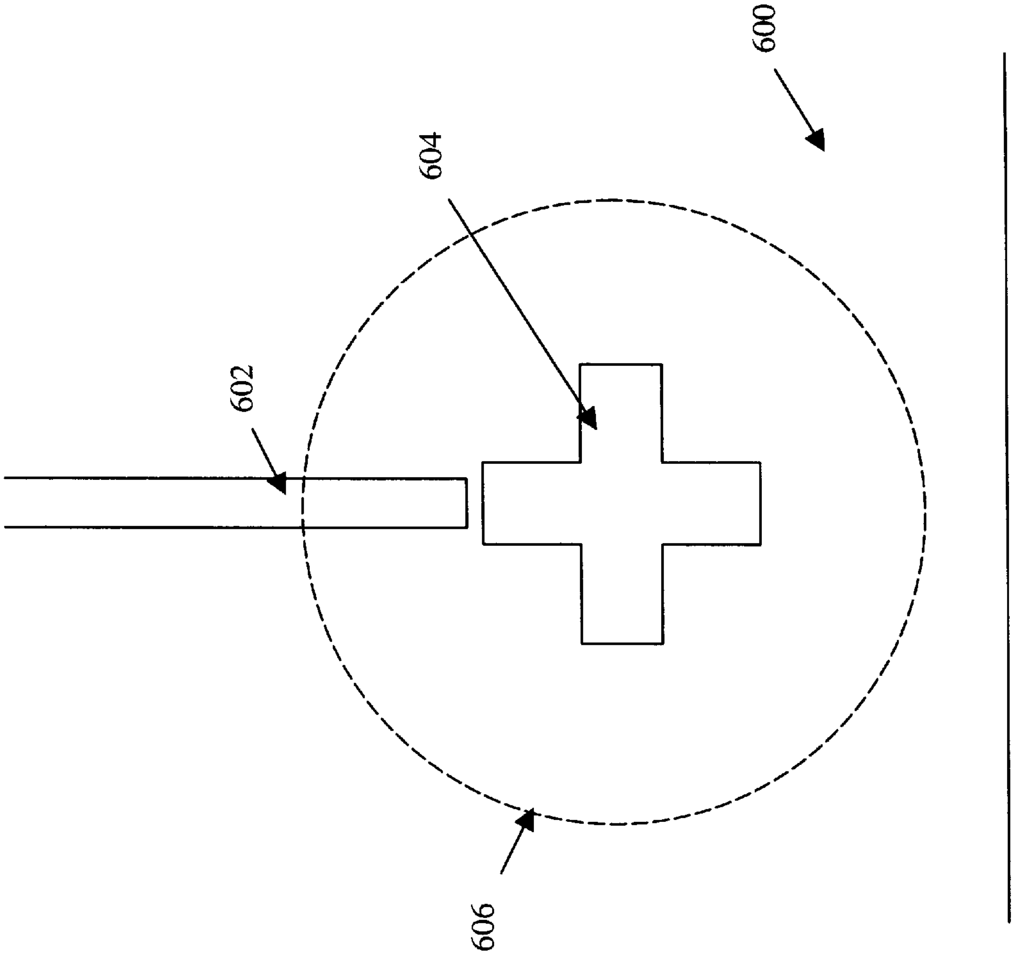
FIG. 6 illustrates an alignment structure for use in facilitating the fabrication of additional elements on a substrate of a microfluidic device, e.g., for drilling holes through the substrate.

By fabricating the alignment mark at the same time as the channel structures, one is assured that this mark is properly aligned with those structures. A schematic illustration of this type of alignment facilitating mark is shown in FIG. 6. As shown, a substrate layer 600 is provided which is to be mated with one or more additional substrate layers to produce the device that incorporates the channel network, e.g., as shown in FIG. 4. A network of grooves, represented by groove 602, is fabricated into the surface of the substrate 600. As noted above, the grooves may be fabricated by a number of means depending upon the nature of the substrate used. For example, polymeric substrates may be injection molded, hot embossed, laser ablated or the like, while silica-based substrates, e.g., glass, quartz, silicon or the like, are typically etched by conventional photolithography and wet chemical etching, reactive ion etching, or the like.

The same fabrication steps used to fabricate the network of grooves are also used to fabricate an alignment or guide mark or hole 604. As shown, the guide hole is a recessed "X" that is etched or otherwise fabricated into the surface. Although shown as an "X" it will be appreciated that a variety of mark shapes and sizes may be employed for the alignment mark, e.g., circles, squares, or other polygons. When a drill bit or other tool is inserted into the alignment mark, the edges of the mark prevent excessive wandering of that tool during the machining process such that the machining process is maintained within a predefined region. In the illustrated example, the diameter of the drill bit or other tool is illustrated by the dashed line 606, showing that the finished hole will communicate with the groove 602. This is particularly suited for fabricating an aperture or reservoir that communicates with the groove 602. Although the mark is illustrated as being smaller than the diameter of the drill bit, it will be appreciated that larger marks may also be used, provided they perform the ultimately desired function, e.g., allowing communication between the drilled hole and the channel network, etc. As shown, the alignment mark 604 is also capable of functioning as a pure alignment mark to facilitate alignment of an overlaying substrate that contains an aperture. In that case, the aperture dimensions in the overlaying substrate are indicated by the dashed line 606. In mating the two substrate layers, the aperture is centered over the alignment mark 604, in order to ensure fluid communication with groove 602.

In a similar fashion, alternative fabrication strategies can take advantage of the concepts of the present invention, namely, the fabrication of alignment structures that can be used in accurately aligning tooling or other structural components of the device.

Figure 7B:
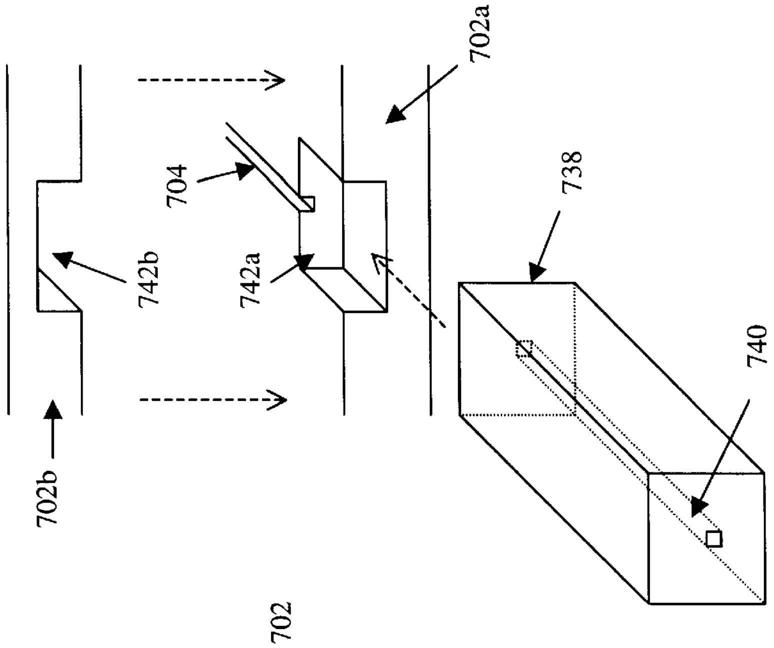
FIGS. 7A–B illustrate the use of an alignment key in the fabrication of microfluidic devices. As illustrated, the alignment key is also an external pipettor element.
Figure 7A:
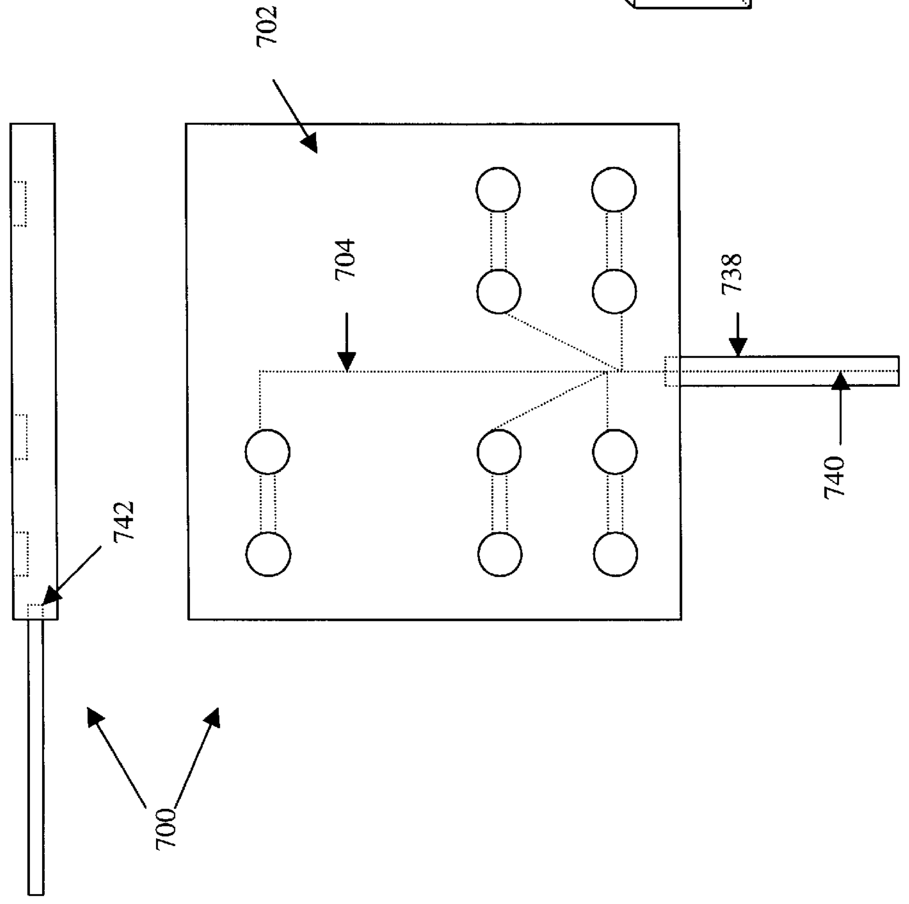

For example, as noted above, in some cases, a capillary element that is to be attached to a planar device may be a rectangular capillary element. In such cases, the attachment site for the capillary may be fabricated as part of the same fabrication process used in the channel structures of the device. This is schematically illustrated in FIG. 7. In particular, an example of a device similar to that shown in FIG. 4, but including a collinear, substantially rectangular capillary element, is shown in FIG. 7A. As shown, the overall device 700 again includes a main body structure 702, which includes integrated channel network disposed in its interior. The rectangular capillary element 738 includes a capillary channel 740 running its length. The capillary element is attached to the body structure via a rectangular opening 742 in the body structure 702. Insertion of a rectangular end of the capillary element 738 into rectangular opening 742 places the capillary channel 740 into fluid communication with at least one of the channels in the integrated channel network within the body structure.

Because the opening 742 in the body structure is substantially rectangular, it is more conveniently fabricated than circular openings. In particular, while circular openings are typically drilled or air abraded into a body structure, rectangular openings are more conveniently fabricated by fabricating rectangular notches in two substrates by, e.g., photolithographic methods, which substrates are mated to define the body structure of the device. The two notches are positioned to provide a single rectangular opening in the side of the body structure. FIG. 7B illustrates an expanded view of the joining of a rectangular capillary with a two-layer microfluidic device. As shown, the device comprises a two-layer body structure including the above-described notches. As shown, the body structure 702 is made up of at least first and second planar substrates 702*a* and 702*b*, respectively. The upper surface of the lower substrate 702*a* includes grooves fabricated therein, which correspond to the desired channel structure of the finished device, e.g., groove 704. The upper substrate 702*b* is mated and bonded to the upper surface of the lower substrate 702*a* (as illustrated by the dashed arrows). Typically, bonding is carried out by thermal bonding techniques, which result in a single integrated unit having sealed channels or conduits running through its interior. The upper substrate also typically includes a number of holes disposed through it (not shown), which holes align with and provide access to the channels of the finished device. The lower and upper substrates also include notches 742*a* and 742*b*, respectively, which are aligned when the two substrates are mated, to define an opening.

The existence of notches on both the upper and lower substrates function as alignment structures in accordance with the present invention. In particular, a capillary element that is to be inserted into the opening formed by the notches can function as an alignment key in aligning the upper and lower substrates. Specifically, during the process of bonding the upper and lower substrates together, the capillary element is inserted into the opening created by the two notches. This capillary element maintains the relative positions of these substrates throughout the bonding process. In addition, the final bonded product also includes the capillary element bonded in place. This may then be sealed into place using an appropriate adhesive, epoxy or the like. It will be appreciated that although the capillary element has been described as functioning as an alignment key, a separate alignment key optionally may be used. Specifically, notches may be fabricated into the upper and lower substrates. An alignment key, such as a shim or "biscuit" may be inserted into the notch in the first substrate. The second substrate is then mated with the first substrate such that the alignment key also inserts into the notch on the second substrate.

Although these notches could be of any shape, e.g., rectangular, hemispherical, trapezoidal, etc., it is generally easier to fabricate substantially rectangular notches, e.g., using the same fabrication techniques and steps used in fabricating the grooves/channels of the device 700, e.g., groove 704. Substantially rectangular notches produce a substantially rectangular opening along the edge of the body structure of the device. The notches generally range in depth depending upon the dimensions of the rectangular capillary element to be inserted therein. Typically, however, these notches will range in depth from about 10 $\mu$m to about 50 $\mu$m, and will be fabricated to make the transition from the channel in the capillary element to the channel in the device's body structure. For example, where a capillary element has a wall thickness of 15 $\mu$m (e.g., minor axis or interior diameter of 15 $\mu$m, with wall thickness of 15 $\mu$m yielding overall cross section of 45 $\mu$m), the notch 742*a* on the lower substrate 702*a* will typically be approximately 30 $\mu$m deep, e.g., allowing for 15 $\mu$m wall thickness and a 15 $\mu$m deep channel which matches up with the minor axis of the capillary element, while the notch 742*b* on the upper substrate 702*b* will be approximately 15 $\mu$m deep to accommodate the upper wall of the capillary element. The notches typically extend into the substrate, e.g., away from the edge, up to about 2 mm, in order to conveniently and fixedly receive the capillary element.

A substantially rectangular capillary element 738 is then inserted and attached to the body structure 702 via the opening (as shown by the dashed arrow). Typically, attachment of the capillary element is accomplished using an adhesive, e.g., epoxy, although other bonding techniques may also be used depending upon the nature of the materials used, e.g., thermal bonding, solvent welding, etc.

Although the capillary element 738 is shown as being collinear with the main analysis channel 704 of the device 700, it will be readily apparent that the rectangular capillary element can be curved or bent out of the plane of the channel network to provide a more useful sampling capillary. Bent capillaries can be held in the bent shape, e.g., by applying a rigid bent sheath, i.e., plastic sheath or a coated sheath of polyimide or Teflon (polytetrafluoroethylene) or the like, over the capillary element to hold the capillary in the bent or curved orientation. Alternatively, a rectangular capillary can extend out of the plane of the channel network, e.g., perpendicular to the channel network plane, e.g., as shown in FIG. 4. In particular, rectangular openings could be readily fabricated into the lower substrate 702*a* using well known fabrication techniques, e.g., etching.

All publications and patent applications are herein incorporated by reference to the same extent as if each individual publication or patent application was specifically and individually indicated to be incorporated by reference. Although the present invention has been described in some detail by way of illustration and example for purposes of clarity and understanding, it will be apparent that certain changes and modifications may be practiced within the scope of the appended claims.

What is claimed is:

1. A microfluidic device, comprising:

a first substrate layer comprising at least a first planar surface having at least a first microscale groove fabricated therein, the groove terminating at at least one end in a well also fabricated into the first surface; and a second substrate layer comprising at least a first aperture disposed therethrough, the aperture being of smaller dimensions than the well, wherein the second substrate layer is mated with the first surface of the first substrate layer to cover the groove and positioned such that the aperture is in complete communication with the well.

2. The microfluidic device of claim 1, wherein the well and aperture are circular.

3. The microfluidic device of claim 2, wherein the well comprises a diameter that is at least 2% larger than a diameter of the aperture.

4. The microfluidic device of claim 2, wherein the well comprises a diameter that is at least 5% larger than a diameter of the aperture.

5. The microfluidic device of claim 2, wherein the well comprises a diameter that is at least 10% larger than a diameter of the aperture.

6. The microfluidic device of claim 2, wherein the well comprises a diameter that is at least 20% larger than a diameter of the aperture.

7. The microfluidic device of claim 1, wherein the well comprises a diameter of between about 1 mm and about 10 mm.

8. The microfluidic device of claim 1, wherein the aperture comprises a diameter of between about 1 mm and about 10 mm.

9. The microfluidic device of claim 1, wherein the groove terminates at a second well at a second end, and wherein the second substrate comprises a second aperture, the second aperture being positioned to be in complete communication with the second well when the second substrate is mated with the first surface of the first substrate layer.

10. The microfluidic device of claim 9, further comprising at least a first and second electrode disposed within the first and second apertures of the microfluidic device.

11. The microfluidic device of claim 1, further comprising a pressure or vacuum source operably coupled to the first aperture of the microfluidic device.

12. The microfluidic device of claim 1, wherein the first substrate surface comprises a silica-based substrate, and the first groove and well are etched into the first surface.

13. The microfluidic device of claim 1, wherein the first surface of the first substrate comprises a polymeric material.

14. The microfluidic device of claim 13, wherein the polymeric material is selected from polymethylmethacrylate (PMMA), polycarbonate, polytetrafluoroethylene, polyvinylchloride (PVC), polydimethylsiloxane (PDMS), polysulfone, polystyrene, polymethylpentene, polypropylene, polyethylene, polyvinylidine fluoride, and ABS (acrylonitrile-butadiene-styrene copolymer).

15. The microfluidic device of claim 13, wherein the first groove and well are fabricated into the first surface of the first substrate by injection molding.

16. The microfluidic device of claim 13, wherein the first groove and well are fabricated into the first surface of the first substrate by embossing the groove and well into the first surface.

17. The microfluidic device of claim 13, wherein the first groove and well are fabricated into the first surface of the first substrate by laser ablating the groove and well into the first surface.

18. The microfluidic device of claim 1, further comprising at least a second groove fabricated into the first surface of the first substrate, the second groove terminating in at least a second well, wherein the second substrate comprises a second aperture, the second aperture being positioned to be in complete communication with the second well when the second substrate is mated with the first surface of the first substrate layer.

19. The microfluidic device of claim 10, wherein the second groove intersects with the first groove.

* * * * *